United States Patent
Sebring et al.

(10) Patent No.: US 9,473,707 B2
(45) Date of Patent: Oct. 18, 2016

(54) SYSTEMS AND METHODS FOR PRODUCING VISUAL REPRESENTATIONS OF OBJECTS

(71) Applicants: Steven Sebring, New York, NY (US); Leo Fernekes, Bangkok (TH)

(72) Inventors: Steven Sebring, New York, NY (US); Leo Fernekes, Bangkok (TH)

(73) Assignee: Durst Sebring Revolution, LLC, New York, NY (US)

( * ) Notice: Subject to any disclaimer, the term of this patent is extended or adjusted under 35 U.S.C. 154(b) by 11 days.

(21) Appl. No.: 14/837,882

(22) Filed: Aug. 27, 2015

(65) Prior Publication Data

US 2015/0365606 A1    Dec. 17, 2015

Related U.S. Application Data

(63) Continuation of application No. 14/449,742, filed on Aug. 1, 2014, now Pat. No. 9,123,172, which is a continuation of application No. PCT/US2014/038785, filed on May 20, 2014.

(60) Provisional application No. 61/825,306, filed on May 20, 2013.

(51) Int. Cl.
*H04N 5/247* (2006.01)
*G06T 7/20* (2006.01)
(Continued)

(52) U.S. Cl.
CPC .............. *H04N 5/247* (2013.01); *G06T 7/004* (2013.01); *G06T 7/2093* (2013.01); *G06T 11/20* (2013.01);
(Continued)

(58) Field of Classification Search
CPC ............ G06T 15/205; G06T 2200/21; G06T 7/2093; G06T 7/004; G06T 11/20; G06T 2200/08; H04N 5/247; H04N 5/2252; H04N 5/23293
See application file for complete search history.

(56) References Cited

U.S. PATENT DOCUMENTS 3,682,064 A   8/1972   Matsunaga et al.
5,164,823 A   11/1992  Keeler
(Continued)

FOREIGN PATENT DOCUMENTS

CA   2208556 A1   6/1996
EP   0799547 B1   3/2003
(Continued)

OTHER PUBLICATIONS

"Events in a Nutshell: A freshly-picked bunch of innovative solutions presented by the industry, and the most important aspects of the service delivery" [online] Nov. 1, 2012 https://eleanorroselucy.wordpress.com/2012/11/01/freeze-360/ [Retrieved Sep. 17, 2015], 9 pages.
(Continued)

*Primary Examiner* — Manav Seth
(74) *Attorney, Agent, or Firm* — Ostrolenk Faber LLP

(57) ABSTRACT

A system for producing a visual representation of an object includes a structure for at least partially circumscribing the object, a plurality of still cameras mounted in fixed relation to each other, and at least one computer processor. The one or more computer processors trigger the plurality of still cameras to capture a plurality of still images of the object, create the visual representation of the object by, at least in part, arranging at least some of the plurality of still images in an order, and transmit a digital file that includes the visual representation of the object to a storage medium accessible by a user device. The visual representation of the object is user manipulable to permit presenting the visual representation in more than one way.

30 Claims, 9 Drawing Sheets

(51) Int. Cl.
- *G06T 7/00* (2006.01)
- *G06T 15/20* (2011.01)
- *G06T 11/20* (2006.01)
- *H04N 5/225* (2006.01)
- *H04N 5/232* (2006.01)

(52) U.S. Cl.
CPC ........... *G06T 15/205* (2013.01); *H04N 5/2252* (2013.01); *H04N 5/23293* (2013.01); *G06T 2200/08* (2013.01); *G06T 2200/21* (2013.01)

(56) References Cited

U.S. PATENT DOCUMENTS

| | | | |
|---|---|---|---|
| 5,659,323 A * | 8/1997 | Taylor | G03B 19/026 348/159 |
| 6,052,539 A | 4/2000 | Latorre | |
| 6,154,251 A | 11/2000 | Taylor | |
| 6,157,733 A | 12/2000 | Swain | |
| 6,331,871 B1 | 12/2001 | Taylor | |
| 6,463,215 B1 | 10/2002 | O'Connolly et al. | |
| 6,477,267 B1 | 11/2002 | Richards | |
| 6,522,325 B1 | 2/2003 | Sorokin et al. | |
| 6,535,226 B1 | 3/2003 | Sorokin et al. | |
| 6,670,984 B1 | 12/2003 | Tanaka et al. | |
| 6,700,605 B1 | 3/2004 | Toyoda et al. | |
| 6,891,566 B2 | 5/2005 | Marchese | |
| 6,909,457 B1 | 6/2005 | Fukasawa | |
| 6,933,966 B2 | 8/2005 | Taylor | |
| 7,042,494 B2 | 5/2006 | Broemmelsiek et al. | |
| 7,075,565 B1 | 7/2006 | Raymond et al. | |
| 7,421,097 B2 | 9/2008 | Hamza et al. | |
| 7,613,999 B2 * | 11/2009 | Weber | G03B 37/04 348/148 |
| 7,843,497 B2 * | 11/2010 | Conley | H04N 5/262 348/159 |
| 8,027,531 B2 | 9/2011 | Wilburn et al. | |
| 8,520,054 B2 | 8/2013 | Cox et al. | |
| 8,704,903 B2 | 4/2014 | McClellan | |
| 8,811,812 B1 | 8/2014 | Lawler et al. | |
| 8,988,599 B2 | 3/2015 | Debevec et al. | |
| 2001/0028399 A1 | 10/2001 | Conley | |
| 2002/0063775 A1 * | 5/2002 | Taylor | G03B 19/026 348/48 |
| 2003/0229735 A1 | 12/2003 | Sorokin et al. | |
| 2004/0183908 A1 | 9/2004 | Tominaga et al. | |
| 2010/0321475 A1 * | 12/2010 | Cox | H04N 5/232 348/47 |
| 2012/0314089 A1 | 12/2012 | Chang et al. | |
| 2013/0188063 A1 * | 7/2013 | Cameron | H04N 5/272 348/207.1 |
| 2014/0347441 A1 | 11/2014 | Latorre | |

FOREIGN PATENT DOCUMENTS

| | | |
|---|---|---|
| EP | 1296179 B1 | 11/2004 |
| WO | WO-9619892 A1 | 6/1996 |

OTHER PUBLICATIONS

"Mini-MCA Tetracam's Miniature Multiple Camera Array", Tetracam Inc., Chatsworth, CA, 2011.

Beltrone, "Mohegan Sun Installs 360-Degree Photo Booth CRM Tool Lets Guests Share Clips via Facebook, Twitter" [Online] Adweek, Feb. 27, 2012, 3 pages.

Catani et al. "A Large Distributed Digital Camera System for Accelerator Beam Diagnostics" Review of Scientific Instruments 76, 073303, 2005.

Huang et al. "Distributed Video Arrays for Tracking, Human ID and Activity Analysis" Computer Vision and Robotics Research (CVRR) Laboratory, 2003.

International Search Report and Written Opinion for International Application No. PCT/US2014/038785, mailed Nov. 27, 2014, 16 pages.

Invitation to Pay Additional Fees and, Where Applicable, Protest Fee for International Application No. PCT/US2014/038785, mailed Sep. 5, 2014, 7 pages.

Lei et al. "Design and Implementation of a Cluster Based Smart Camera Array", Department of Computing Science, University of Alberta, 2008.

Rui et al. "Building an Intelligent Camera Management System" Microsoft Research Laboratory, ACM Multimedia, 2001.

Solh et al. "The Mosaic Camera: Streaming, Coding and Compositing Experiments", Georgia Institute of Technology, 2008.

Wilburn et al. "High Performance Imaging Using Large Camera Arrays", Dept. of Electrical Engineering, Stanford University, 2005.

Wilburn et al. "High-Speed Videography Using a Dense Camera Array" Department of Electrical Engineering, Department of Computer Science, Stanford University, 2004.

* cited by examiner

SYSTEMS AND METHODS FOR PRODUCING VISUAL REPRESENTATIONS OF OBJECTS

CROSS-REFERENCE TO RELATED APPLICATIONS

This application is a continuation of, claims priority to and the benefit of, and incorporates herein by reference in its entirety U.S. patent application Ser. No. 14/449,742, which was filed on Aug. 1, 2014 and issued on Sep. 1, 2015 as U.S. Pat. No. 9,123,172. U.S. patent application Ser. No. 14/449,742 is a continuation of, and claims priority to and the benefit of, International Patent Application No. PCT/US2014/038785, which was filed on May 20, 2014 and which itself claims priority to and the benefit of U.S. Provisional Patent Application No. 61/825,306, which was filed on May 20, 2013. The contents of International Patent Application No. PCT/US2014/038785 and U.S. Provisional Patent Application No. 61/825,306 are also incorporated herein by reference in their entireties.

TECHNICAL FIELD

In various embodiments, the present invention relates to systems and methods for producing visual representations of objects.

BACKGROUND

Photography—the art of creating durable images by recording light or other electromagnetic radiation—has been practiced for nearly two centuries. In the early practice of photography, light-sensitive materials, such as photographic films, were often employed to capture images via a chemical process. For example, a lens was used to focus the light reflected or emitted from an object into a real image on a light-sensitive surface inside a camera during a timed exposure. While such practices may still be employed, more recent advances have allowed images to be captured electronically through use of an image sensor. The result in an electronic image sensor is an electrical charge at each pixel, which is electronically processed and stored in a digital image file for subsequent display or processing.

One difference between digital and chemical photography is that chemical photography generally resists photo manipulation because it involves film and photographic paper, while digital imaging is a highly manipulative medium. This difference allows for a degree of image post-processing in digital photography that is comparatively difficult in film-based photography. However, while the advent of inexpensive digital image sensors and even the ability to create photographs that combine information from a number of sensed images have begun to change the way society thinks about photography, a need still exists for improved systems and methods for producing visual representations of objects.

SUMMARY OF THE INVENTION

In various embodiments, the systems and methods described herein employ a plurality of still cameras to capture digital images of an object or of a scene from multiple perspectives or views. For example, in one embodiment, a rig features a plurality of still cameras mounted in fixed relation to one another. In operation, the still cameras are triggered simultaneously (or, alternatively, sequentially following a user-configurable time delay between the triggering of each camera) to capture a plurality of still, digital images of the object or scene. The captured images may then be manipulated in a variety of fashions. For example, by triggering the cameras simultaneously and hopping from one camera image to the next, the illusion of virtual camera movement through a "frozen" dynamic scene, or (where the cameras are arranged to at least partially encircle a stationary object) the illusion of the stationary object being rotated, may be achieved. As another example, a time delay between the triggering of each camera permits one to create the illusion of a single camera moving around a stationary object or within a dynamic scene.

As further described below, such technology may be employed in multiple practical applications. As one non-limiting example, the technology may be employed to revolutionize the typical photo booth found in a mall. In particular, by employing the technology described herein, mall photo booths need no longer be limited to imaging an individual from a single, still perspective. Rather, the technology permits an individual to image himself or herself from multiple perspectives or views and to thereby create the illusion of a single camera moving around himself or herself. The photo booth may, for example, be configured to create a digital file storing a moveable, realistic, and three-dimensional personal avatar of the individual. That digital file may then be downloaded (e.g., wirelessly or through a hard wire connection) by the individual immediately following the photo session to a mobile computing device (e.g., a smartphone for manipulation thereat. The downloaded digital file may, for example, enable the individual through touch input to pan around the just-captured three-dimensional image of his or her figure (e.g., the personal avatar) and to view it from multiple angles. The panning may be started, stopped, reversed, etc. in any manner desired by the user, and the various views may be enlarged, resized, etc. in any manner desired, by the user. Additional manipulation of the personal avatar, for example changing the color or appearance of various features, may also be permitted. In such a fashion, the output from the typical photo booth found in a mall is vastly improved. Multiple additional examples of how such technology may be employed are described below.

In general, in one aspect, embodiments of the invention feature a system for producing a visual representation of an object. The system includes a structure for at least partially circumscribing the object, a plurality of still cameras mounted in fixed relation to each other, and at least one computer processor. The computer processor is employed to trigger the plurality of still cameras to capture a plurality of still images of the object, create the visual representation of the object by, at least in part, arranging at least some of the plurality of still images in an order, and transmit a digital file that includes the visual representation of the object to a storage medium accessible by a user device. In particular, the visual representation of the object is user-manipulable (e.g., through touch input) to permit presenting the visual representation in more than one way.

In various embodiments, the cameras are amiable at a common region. The computer processor may be configured to trigger the cameras substantially simultaneously, or, alternatively, to introduce a trigger delay between, the triggering of each camera. In one particular embodiment, the cameras feature a sequential order and the computer processor is configured to arrange the images captured by the cameras in the sequential order.

The object captured in the images may be, for example, an article of clothing, a fashion accessory, a cosmetic product, or a work of art. Alternatively, in another embodiment, the object captured in the images is an individual. In such an embodiment, the visual representation of the object may be a personal avatar of the individual. In addition, at least one feature in the visual representation of the individual (e.g., the individual's lipstick color) may be user-manipulable through a color palette. At least one article of clothing or fashion accessory in the visual representation of the individual may also be changeable by the user at the user device. The user device may be a mobile computing device, such as, for example, a personal digital assistant, a tablet computer, or a smartphone.

In one embodiment, the structure for at least partially circumscribing the object may feature an entry path and may include a spiral wall. The cameras may be arranged along a portion of the spiral wall. Alternatively, the structure for at least partially circumscribing the object may be a dome. The cameras may be coupled in proximity to the structure and may be arranged in an arcuate pattern. The system may also include an adjustable support for supporting the object. The adjustable support may be, for example, an adjustable sear, an adjustable table, or an adjustable platform.

In general, in another aspect, embodiments of the invention, feature a method for producing a visual representation of an object. In accordance with the method, a plurality of still cameras are focused on the object, the plurality of still cameras are triggered to capture a plurality of still images of the object, the visual representation of the object is created by, at least in part, arranging at least some of the plurality of still images in an order, and a digital file that includes the visual representation of the object is transmitted to a storage medium accessible by a user device. As in the case of the above-described system, the visual representation of the object user-manipulable (e.g., through touch input) to permit presenting the visual representation in more than one way.

In various embodiments of this aspect of the invention, the cameras are triggered substantially simultaneously. In other embodiments, a trigger delay is introduced between the triggering of each camera. In addition, the cameras may have a sequential order and the images captured by the cameras may be arranged in the sequential order.

In various embodiments of the method for producing a visual representation of the object, the object captured in the images is, for example, an article of clothing, a fashion accessory, a cosmetic product, or a work of art. Alternatively, in another embodiment, the object captured in the images is an individual. In such an embodiment, the visual representation of the object may be a personal avatar of the individual. In addition, least one feature in the visual representation of the individual (e.g., the individual's lipstick color) may be user-manipulable through a color palette. At least one article of clothing or fashion accessory in the visual representation of the individual may also be changeable by the user at the user device. The user device may be a mobile computing device, such as, for example, a personal digital assistant, a tablet computer, or a smartphone.

In general, in yet another aspect, embodiments of the invention feature a system for capturing a plurality of still photographic images of an object using a plurality of still cameras. The system include a plurality of trigger modules for triggering a plurality of still cameras. Each trigger module is adapted to be associated with a single still camera and each still camera is adapted to be associated with a single trigger module. The plurality of trigger modules are configured to self-assign sequential hardwire addresses, for example when power is applied thereto. The system may also include the plurality of still cameras.

In various embodiments, the system further includes an additional trigger module, which is unassociated with a camera, to act as a trigger input. The plurality of trigger modules, which may be connected in a daisy-chain, may be configured to trigger the plurality of still cameras substantially simultaneously or to sequentially trigger the plurality of still cameras.

In one embodiment, each trigger module includes a microprocessor, computer memory, a crystal oscillator for providing a stable clock signal (e.g., a temperature-controlled crystal oscillator or an oven-controlled crystal oscillator), and/or a delay timer. Each trigger module may also include one or more serial communication line(s) for communicating serial command data signals and/or one or more communication line(s) for communicating a hardware signal that triggers a camera. Each trigger module may be configured to monitor a status of an associated camera, and the plurality of trigger modules may be configured to validate a status of all signal interconnections between the trigger modules.

In one embodiment, the system further includes a camera system controller for controlling the plurality of trigger modules. The camera system controller may be configured to issue a command indicating a direction in which signals are to propagate through the plurality of trigger modules, a command to set a mode of at least one trigger module, a command to set a delay timer of at least one trigger module, a command to wake at least one camera, and/or a command instructing at least one trigger module to fire a camera.

The system may also include a photography prop (such as a strobe light, a solenoid, and/or a valve) and an additional trigger module that interfaces with the photography prop. Moreover, the system may include one or more computer processor(s) for importing images from the cameras, applying settings to the cameras, and/or arranging at least some of the plurality of still images in an order to create a visual representation of the object. The system can also include a storage medium for storing a digital file that includes the visual representation of the object.

In general, in still another aspect, embodiments of the invention feature a method for capturing a plurality of still photographic images of an object using a plurality of still cameras. In accordance with the method, a plurality of trigger modules are associated with a plurality of still cameras such that each trigger module is associated with a single still camera and each still camera is associated with a single trigger module. The plurality of trigger modules are powered, whereupon the plurality of trigger modules self-assign sequential hardware addresses. The plurality of trigger modules are then used to trigger at least some of the plurality of still cameras, and a plurality of still images of an object are captured via the still cameras that were triggered.

In various embodiments of this aspect of the invention, the plurality of trigger modules are connected in a daisy-chain. The plurality of trigger modules may be used to trigger the plurality of still cameras substantially simultaneously, or to sequentially trigger the plurality of still cameras. Serial command data signals may be communicated through the plurality of trigger modules. In addition, a hardware signal for triggering a camera may be communicated through the plurality of trigger modules. A status of all signal inter connections between the plurality of trigger modules may be validated, and at least one trigger module may be polled for a status of an associated camera.

Optionally, one or more of the following commands may be received at at least one of the trigger modules: a command Indicating a direction in which signals are to propagate through the plurality of trigger modules, a command to set a mode of the at least one trigger module, a command to set a delay timer of the at least one trigger module, a command to wake the camera associated with the at least one trigger module, and/or a command instructing the at least one trigger module to fire an associated camera. An additional trigger module may be used to actuate a photography prop, such as a strobe light, a solenoid, and/or a valve.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations. Equivalent structures and methods may also be employed.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

In various embodiments, the present invention features systems and methods for producing visual representations of objects. In particular, a plurality of still cameras are triggered to capture multiple still images of an object, and the images are then used in creating a digital file that includes the visual representation of the object. That digital file may then be downloaded to a user device, or otherwise transmitted to a storage medium accessible by the user device, and thereafter manipulated through use of the user device.

Figure 1:
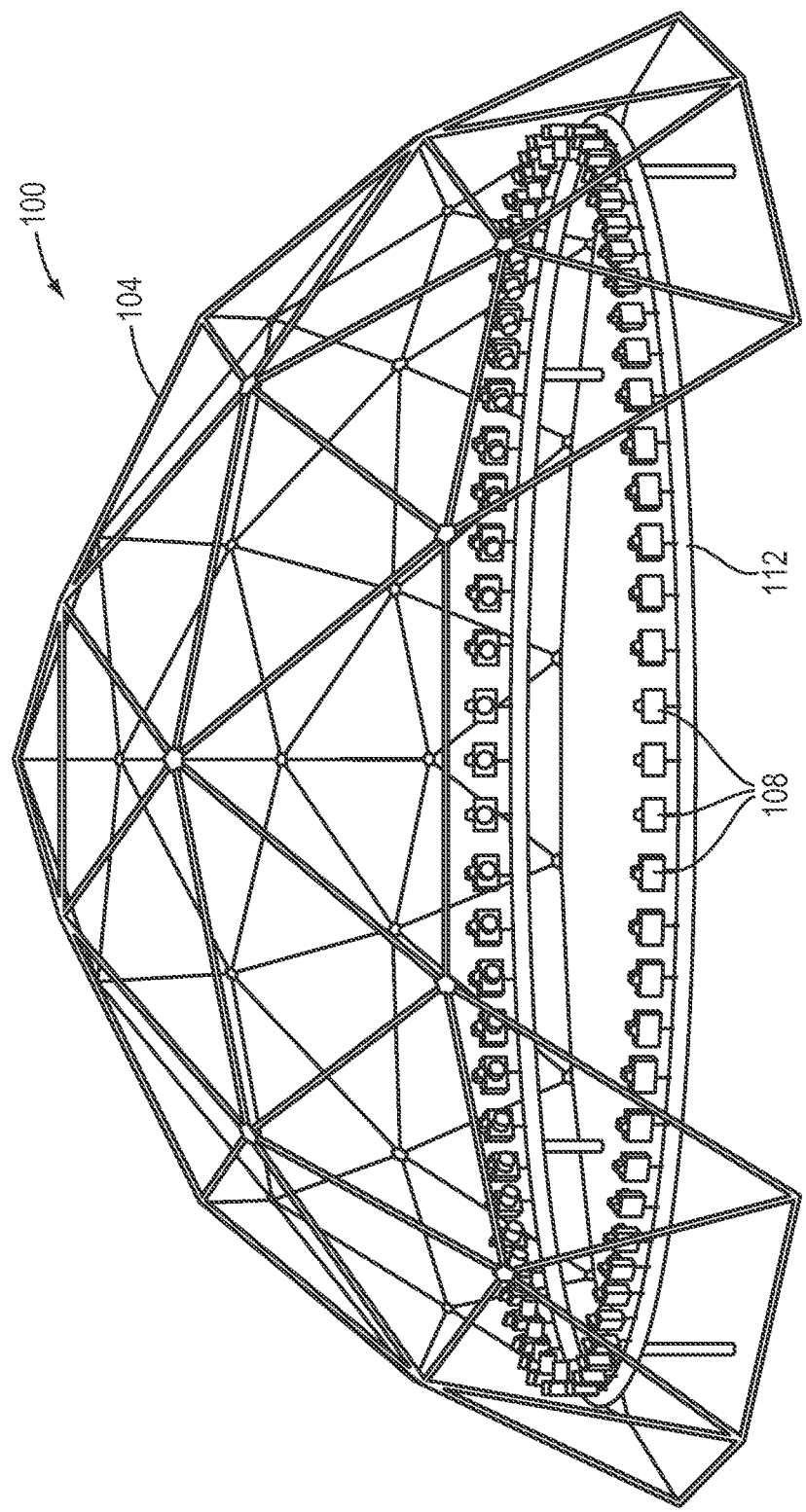
FIG. 1 schematically illustrates a side view of a system, with its exterior paneling removed, that is used in producing a visual representation of an object in accordance with one embodiment of the invention.

FIG. 1 depicts a side view of a system 100 that is used in producing a visual representation of an object in accordance with one embodiment of the invention. As shown, the system 100 includes a structure 104 for at least partially circumscribing the object. In particular, the structure 104 depicted in FIG. 1 is a geodesic dome and the object to be imaged (not shown) as described herein may be located within the interior of the dome 104. Other types of domes (including oval domes, polygonal domes, sail domes, and umbrella domes, to name but a few) may also be employed as the structure 104, as will be understood by one of ordinary skill in the art. In addition, a stage may be located within the inside of the domed structure 104 in order to support the object to be imaged.

As also shown in FIG. 1, the system 100 further includes a plurality of still cameras 108 mounted in fixed relation to each other, either to the structure 104 or to another support. In particular, the system 100 may include a ring 112 of steel pipe that is itself mounted on hydraulic jacks. As illustrated, the plurality of still cameras 108 may be mounted to the ring 112, and the cameras 108 themselves may thereby be arranged in a ring. More generally, however, the cameras 108 may be coupled in proximity to the interior of the structure 104 in any fashion (e.g., co-planar) and be arranged in any arcuate (e.g., semi-circular) or other (e.g., linear) pattern or patterns. By mounting the cameras 308 to the ring 112 that is itself mounted on hydraulic jacks, the ring 112 and thereby the cameras 108 may be raised, lowered, or tilted in order to give different perspective or elevational views of the object to be imaged. Alternatively or additionally, any stage on which the object is supported can be adjusted in height, tilt, etc.

In one embodiment, there are 100 still cameras 108 mounted to the ring 112. Alternatively, fewer or more cameras 108 may be employed. In one particular embodiment, each camera 108 is a Canon Rebel T2i DSLR Camera and employs a Canon 18-55 mm Zoom Lens, each of which is available from Canon, Inc. of Tokyo, Japan. Each camera 108 may also be mounted to the ring 112 using a Manfrotto 410 Junior Geared Head, available from Lino Manfrotto+ Co. Spa of Cassola, Italy. The Manfroto 410 Junior Geared Head enables precise and accurate movement of the cameras 108. In particular, it may be employed to aim each camera 108 at a common region, (i.e., at the object to be imaged). Of course, as will be understood by one of ordinary skill in the art, other types of digital cameras 108 (including custom-built cameras), zoom lenses, and camera heads may be employed.

Figure 2:
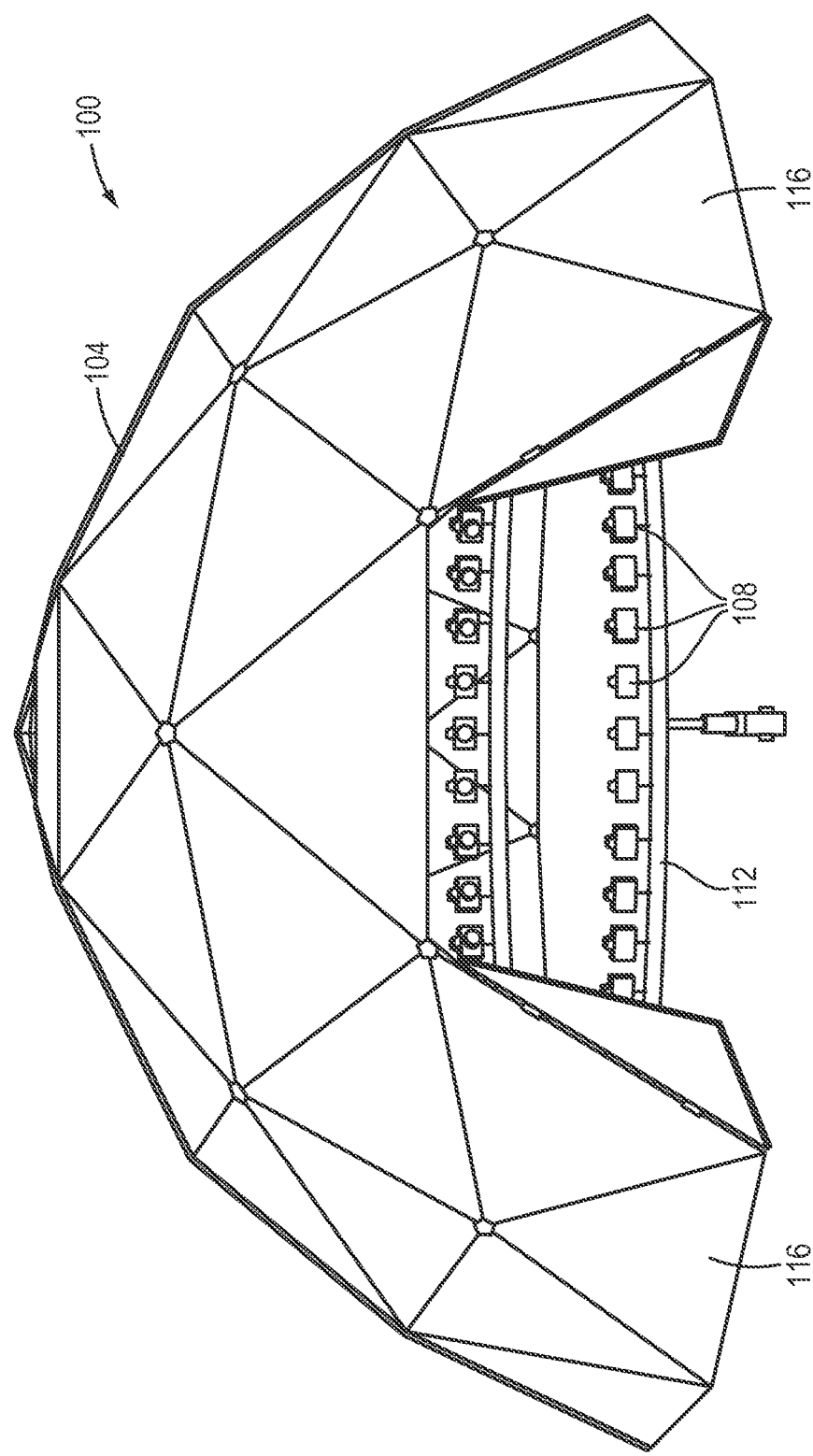
FIG. 2 schematically illustrates a side view of the exemplary system depicted in FIG. 1, but with the exterior paneling intact.

In FIG. 1, the exterior paneling of the structure 104 is not shown so as to facilitate a depiction of the interior of the system 100. Exterior panels 116 for the structure 104 are, however, depicted in FIG. 2. Externally, the domed structure 104 may be built out of metal pipes in triangular patterns to maximize strength at low weight. Within these triangles are the custom-made panels 116 that create the background for the inside of the domed structure 104. The panels 116 may be removable and/or hinged to permit access to the interior of the structure 104. The panels 116 may be of any color, including black, white, etc., and may be made of fabric, paper, metal, reflective metallized films, etc. In one embodiment, the system 100 is built in a modular fashion such that it can be broken down, packed up into travel cases, and shipped anywhere in the world for use thereat.

Figure 3:
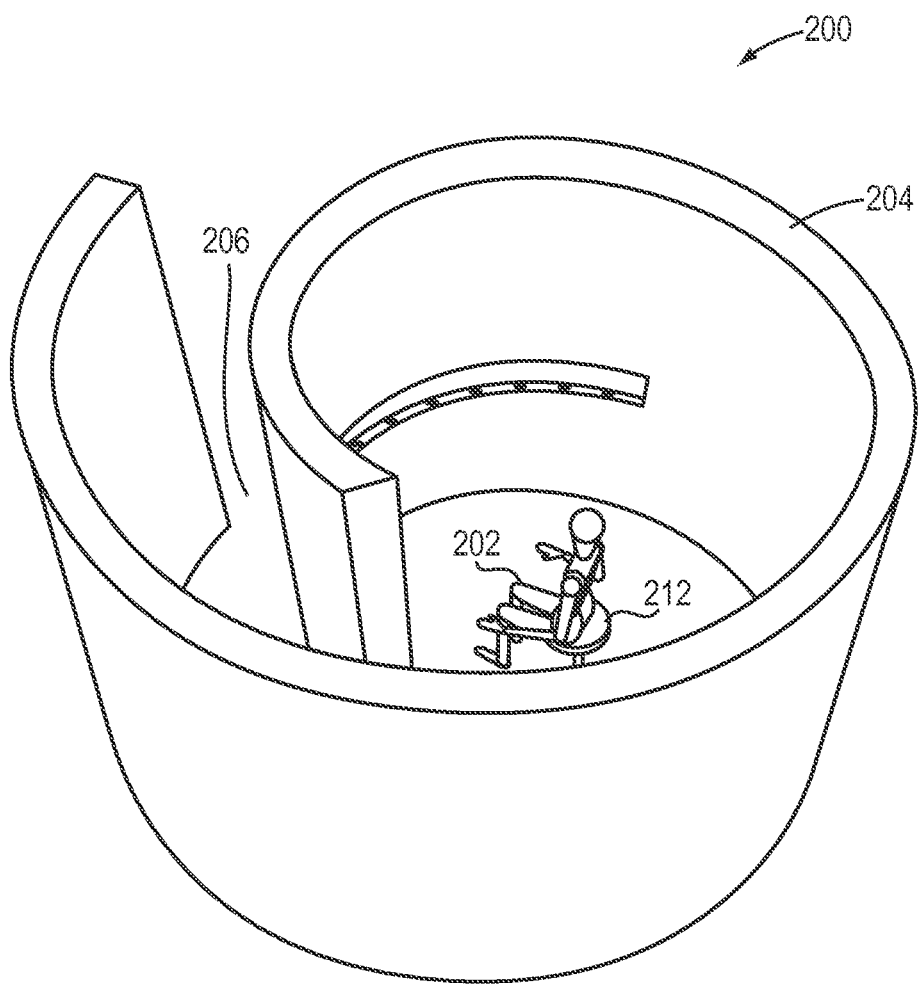
FIG. 3 schematically illustrates a top perspective view of a system that is used in producing a visual representation of an object in accordance with another embodiment of the invention.
Figure 4:
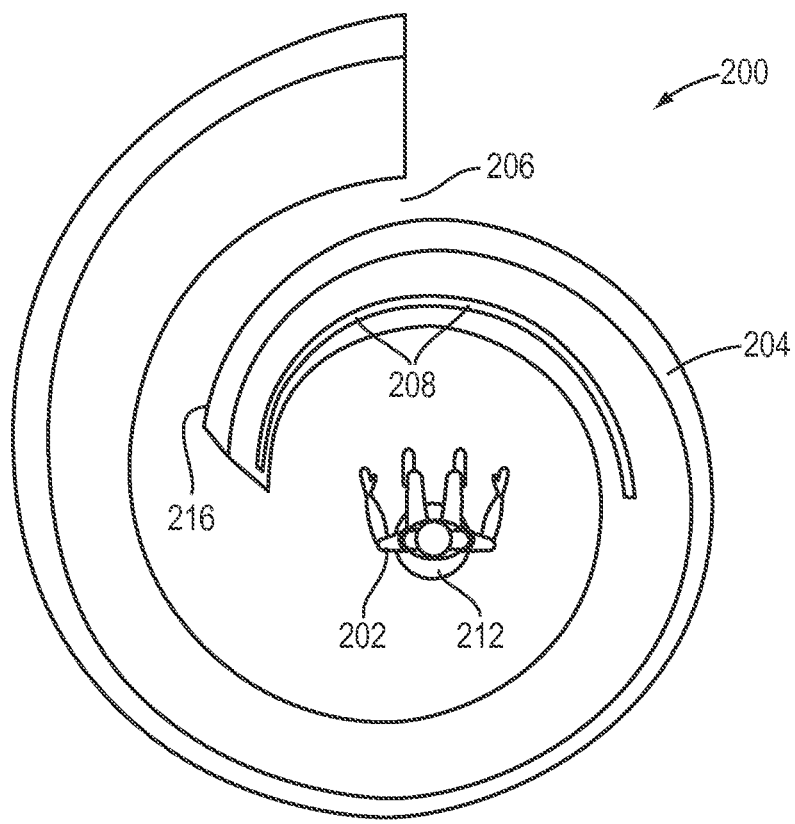
FIG. 4 schematically illustrates a top view of the exemplary system depicted in FIG. 3.

FIG. 3 depicts a top perspective view of a system 200 that is used in producing a visual representation of an object 202 in accordance with another embodiment of the invention, while FIG. 4 depicts a top view of the exemplary system 200 shown in FIG. 3. As shown in FIGS. 3 and 4, the system 200, like the system 100, includes a structure 204 for at least partially circumscribing the object 202. In particular, the structure 204 depicted in FIGS. 3 and 4 is a spiral wall and the object 202 to be imaged as described herein is located within the interior bounds of the spiral wall 204. As also shown, the spiral wall 204 forms an entry path 206 that may be used to access the interior bounds of the spiral wall 204.

In order to image the object 202, a plurality of still cameras 208 (for example of the type described above in reference to FIGS. 1 and 2) may be arranged along a portion of the spiral wall 204 in visual line of sight of the object 202. For example, the cameras 208 may be arranged along a semi-circular portion of the spiral wall 204, although they may also be arranged along a greater or less arcuate portion of the spiral wall 204.

As depicted in FIGS. 3 and 4, an adjustable support 212 may be employed to support the object 202 to be imaged. For example, the object 202 to be imaged may be an individual and the individual may be seated on an adjustable seat 212. Alternatively, the adjustable support 212 may be an adjustable table, an adjustable platform, or another adjustable support. In such a fashion, the object 202 to be imaged may be raised or lowered within the field of view of the cameras 208 in order to give different perspective or elevational views of the object 202.

In one embodiment, the structure 204 of the system 200 includes a user input/output module 216, such as, for example, an interactive touch screen 216 (i.e., a first user device), to guide the user through the imaging and other processes. For example, after the plurality of still images have been captured and the visual representation of the object 202 created (as described below), the user can use the touch screen 216 to apply different looks to the visual representation and to transmit a digital file storing the visual representation to a storage medium accessible by a second user device (e.g., to the memory of the second user device itself, such as to the memory of a smartphone) for manipulation thereat. For example, the digital file may be downloaded to the second user device wirelessly (e.g., through the internet) or through a hard-wire port (e.g., through a USB connection), may be transmitted to a user's e-mail account or social media site for later access and manipulation by the second user device, etc.

The system 200 may include additional lighting, a user instructional interface, a covering, a music system, etc. to make the system 200 user friendly and adapted for deployment in various locations for use by untrained consumers.

Figure 5:
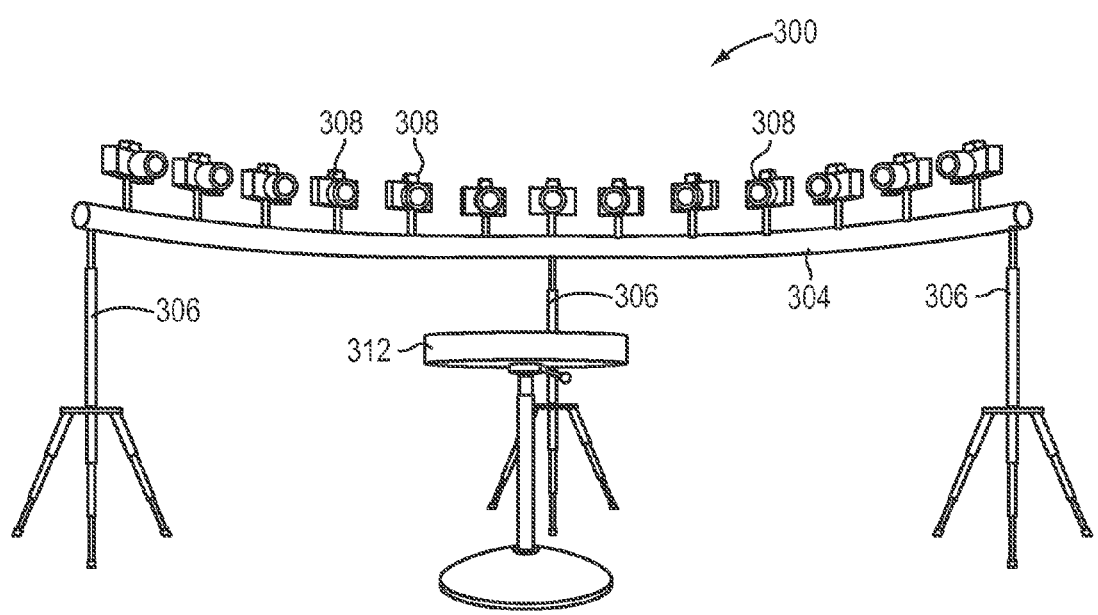
FIG. 5 schematically illustrates a side view of a system that is used in producing a visual representation of an object in accordance with yet another embodiment of the invention.
Figure 6:
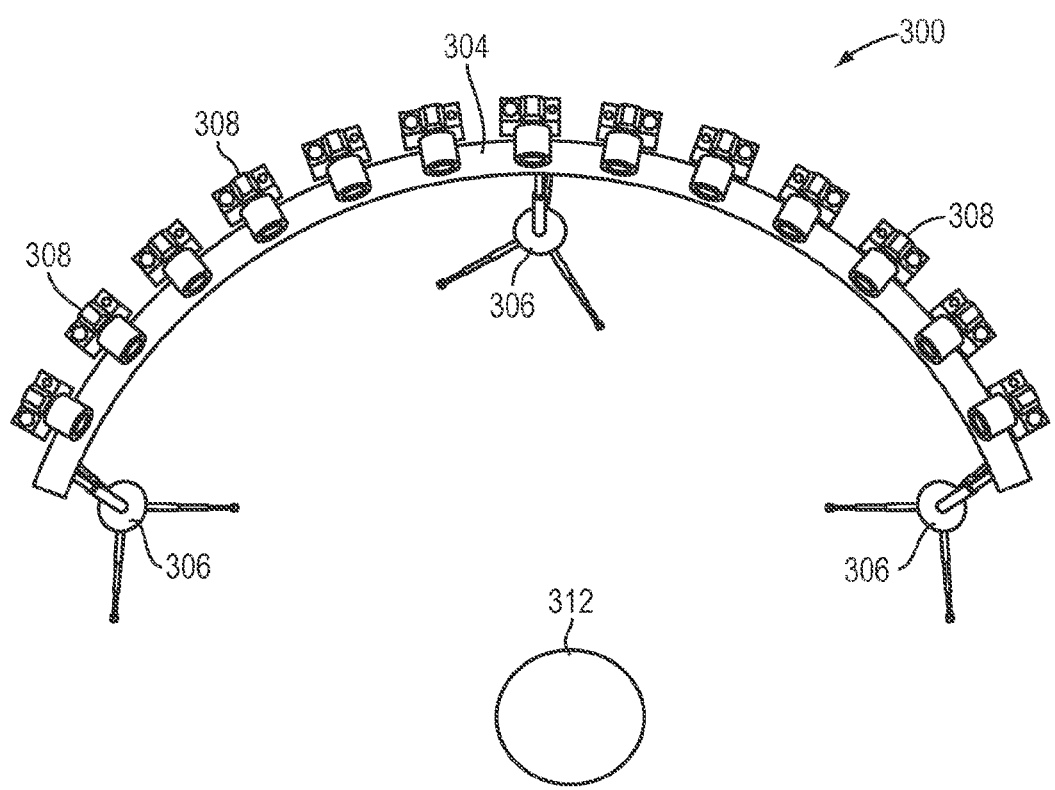
FIG. 6 schematically illustrates a top view of the exemplary system depicted in FIG. 5.

FIG. 5 depicts a side view of a system 300 that is used in producing a visual representation of an object in accordance with yet another embodiment of the invention, while FIG. 6 depicts a top view of the exemplary system 300 shown in FIG. 5. As shown in FIGS. 5 and 6, the system 300, like the systems 100 and 200, includes a structure 304 for at least partially circumscribing the object to be imaged. In particular, the structure 304 depicted in FIGS. 5 and 6 is an arc of steel pipe that is itself mounted on adjustable height stands 306. As illustrated, a plurality (e.g., 13 or other number) of still cameras 308 may be mounted to the arc 304, and the cameras 308 themselves may thereby be arranged in an arcuate pattern. The cameras 308 may be of the type described above in reference to FIGS. 1 and 2, and may be mounted to the arc 304 in a similar fashion to bow the cameras 108 are mounted to the ring 112 (e.g., by using a Manfrotto 410 junior Geared Bead for each camera 308). In operation, the adjustable height stands 306 may be employed to raise or lower the structure 304 (and thereby the cameras 308) in order to give different perspective views of the object to be imaged.

As depicted in FIGS. 5 and 6, the system 300 may also feature an adjustable support 312 for supporting the object to be imaged. For example, the object to be imaged may be an individual and the individual may be seated on an adjustable seat 312. Alternatively, the adjustable support 312 may be an adjustable table, an adjustable platform, or another adjustable support. In such a fashion, the object to be imaged may also be raised or lowered within the field of view of the cameras 308 in order to give different perspective views of the object. In general, the system 300 may be employed to shoot portraits of individuals.

Figure 7:
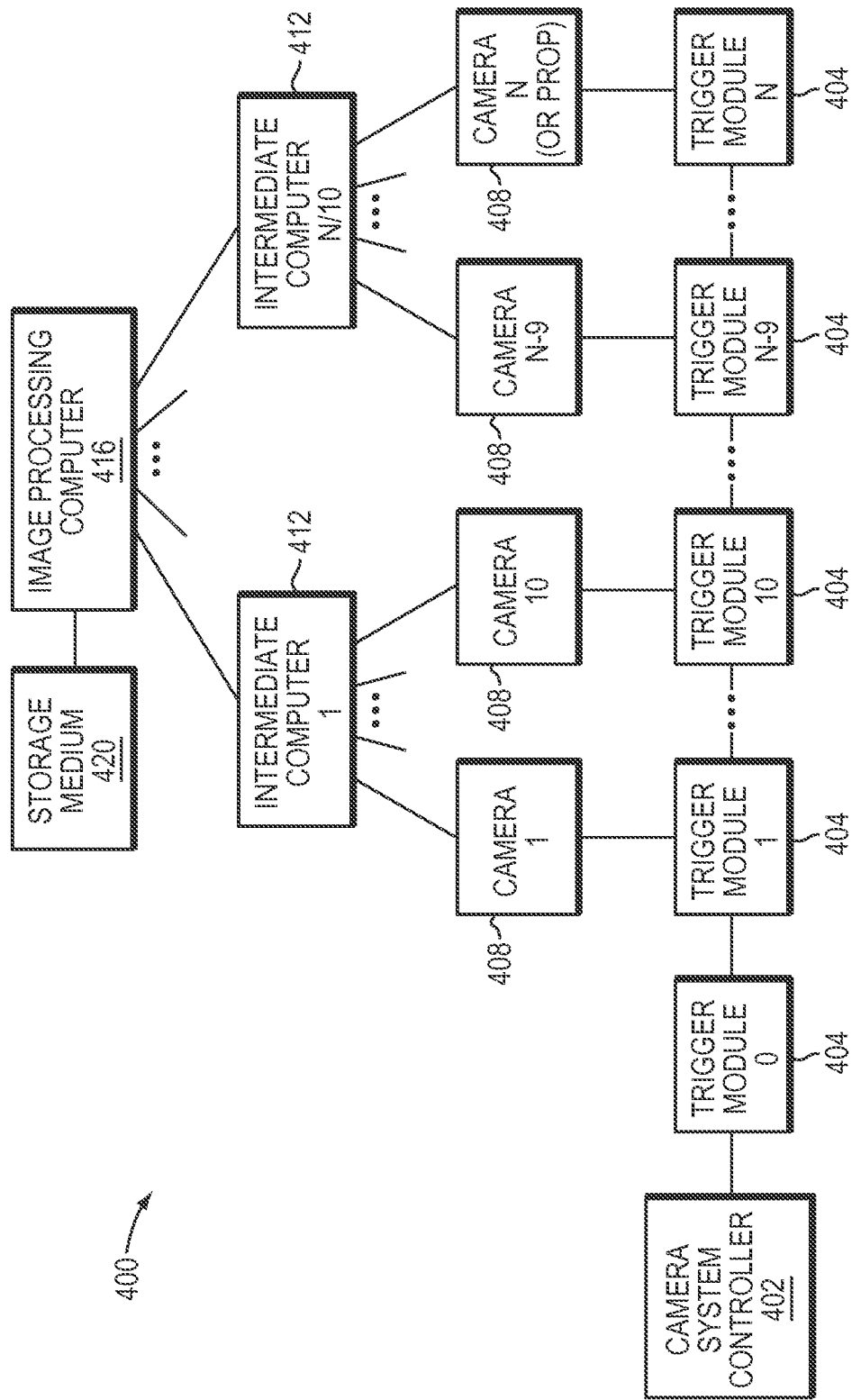
FIG. 7 is a block diagram of a system that is used in producing a visual representation of an object in accordance with one embodiment of the invention.

FIG. 7 depicts a system 400, according to an illustrative embodiment of the invention, for producing a visual representation of an object. The system 400 includes a plurality of still cameras 408 (e.g., N still cameras 408), a camera system controller 402, a plurality of trigger modules 404 (e.g., N+1 trigger modules 404) for use in connection with triggering the plurality of still cameras 408, a plurality of intermediate computers 412 (e.g., N/10 intermediate computers 412), an image processing computer 416, and a storage medium 420.

The camera, system controller 402 may be, for example, any type of personal computer, Windows-based terminal, network computer, wireless device, information, appliance, RISC Power PC, X-device, workstation, mini computer, main frame computer, personal digital assistant, handheld device, or other computing device that is capable of controlling the trigger modules 404 as described herein. In one particular embodiment, the camera system controller 402 is a personal computer panning the Windows XP, Windows Vista, or Windows 7 operating system produced by Microsoft Corporation of Redmond, Wash., as well as control head software. The camera system controller 402 may include, for example, a visual display device (e.g., a computer monitor), a data entry device (e.g., a keyboard), persistent and/or volatile storage (e.g., computer memory), a computer processor, and a mouse. As further described below, the camera system controller 402 may, for example, be employed to set the mode and/or delay of each trigger module 404, to wake the cameras 408, and to instruct the trigger modules 404 to fire the cameras 408.

Each trigger module 404 may be implemented as a hardware device, for example as a microcontroller, as an application-specific integrated circuit (ASIC), or as a field-programmable gate array (FPGA), that is capable of providing the functionality described below. Each trigger module 404 may include, for example, its own microprocessor and memory block. In addition, each trigger module 404 may include a dedicated crystal oscillator to provide a stable clock signal and thereby keep a precise track of the time. The crystal oscillators, which are important for the timing operations of the trigger modules 404 discussed below, may be temperature-controlled crystal oscillators ("TCXOs") or oven-controlled crystal oscillators ("OCXOs").

In one embodiment, trigger module 0 is considered the "tail" trigger module and trigger module N is considered the "head" trigger-module. As illustrated, the trigger modules 404 may be connected from tail to head in a daisy chain using, for example, Cat5e patch cables. Four communication lines may run through the trigger modules 404 and Cat5e patch cables. In particular, a first serial communication line may be provided to communicate serial command data signals from the tail trigger module 0 to the head trigger module N, a second serial communication line may be provided to communicate serial command data signals from the head trigger module N to the tail trigger module 0, a third communication line may be provided to communicate from the tail trigger module 0 to the head trigger module N a hardware signal for triggering the cameras 408, and a fourth communication line may be provided to communicate from the head trigger module N to the tail trigger module 0 a hardware signal for triggering the cameras 408.

In one embodiment, each still camera 408 is associated with a single trigger module 404. The associated trigger module 404 may, for example, be connected to the SHUTTER port of its camera 408 using a 2.5 mm stereo phone plug cable. In one embodiment, as illustrated, there is one more trigger module 404 than there are cameras 408. For example, the tail trigger module 0 is not associated with a camera 408 and instead acts as the trigger input for the daisy chain of trigger modules 404. The cameras 408 may be, for example, of the type described above in reference to FIGS. 1 and 2, and may run on the manufacturer's (e.g., Canon's) operating system. Alternatively, custom-built firmware may operate the cameras 408.

In one embodiment, when power is applied to the daisy chain of trigger modules 404, the trigger modules 404 automatically self-assign sequential (i.e., unique) hardware addresses. For example, the first trigger module 404 in the daisy chain, (i.e., the tail trigger module 0) self-assigns hardware address 0, the next trigger module 404 in the daisy chain (i.e., trigger module 1) self-assigns hardware address 1, and so on until the last trigger module 404 in the daisy chain (i.e., the head trigger module N) self-assigns hardware address N. As mentioned, the tail trigger module 0 acts as the trigger input for the daisy chain of trigger modules 404, meaning that it receives from the camera system controller 402 (and thereafter passes on to the next trigger module 404 in the daisy chain) external signals to wake the cameras 408 and to trigger the shutters of the cameras 408. These signals, and the process by which the system 400 implements them, is further described below.

At start-up (i.e., when power is applied to the daisy chain of trigger modules 404), the system 400 may also validate the status of all signal interconnections. In one embodiment, this validation process is performed as part of the above-described automatic addressing process. For example, on each addressing "hop" from a trigger module M to a trigger module M+1, the trigger module M may verity both the integrity of the two serial communication lines in the trigger module M+1 and the integrity of the two communication lines in the trigger module M+1 that are used to communicate the hardware signal that triggers a camera 408. In particular, the trigger module M may send a test signal up the first serial communication line (which is used for communicating serial command data from tail to head) and wait for the trigger module M+1 to echo the test signal down the second serial communication line (which is used for communicating serial command data from head to tail). In addition, the trigger module M may send a test signal up the third communication line (which is used for communicating from tail to head a hardware signal for triggering a camera 408) and wait for the trigger module M+1 to echo the test signal down the fourth communication line (which is used for communicating from head to tail a hardware signal for triggering a camera 408). If either of these two test signals is not echoed back to the trigger module M, that is an indication of a signal interconnection problem in the trigger module M+1. The trigger module M may thus send serial command data back down the daisy chain of trigger modules 404 to the camera system controller 402 to notify the camera system controller 402 of the potential signal interconnection problem in the trigger module M+1. An operator (e.g., a user interfacing with the camera system controller 402) may thus be notified to investigate the issue. Once the issue is resolved, the validation process may be resumed (e.g., the trigger modules 404 may be re-powered to begin the validation process anew). As such any further signal interconnection problems up the line in the daisy chain of trigger modules 404 may be similarly addressed. In this way, the total system integrity of the trigger modules 404 is guaranteed at the end of a successful addressing cycle.

In one embodiment, each trigger module 404 also includes circuitry for sensing a voltage at its associated camera 408. Accordingly, each trigger module 404 may monitor the state of the connection to its associated camera 408 to ensure that the camera 408 is properly connected and powered on. In one embodiment, rather than being interrupted, the camera system controller 402 polls the trigger modules 404 at the appropriate times to ensure the integrity of the associated cameras 408.

Each intermediate computer 412 may be, for example, any type of personal computer, Windows-based terminal, network computer, wireless device, information appliance, RISC Power PC, X-device, workstation, mini computer, main frame computer, personal digital assistant, handheld device, or other computing device that is capable of interacting with the cameras 408 as described herein. Each intermediate computer 412 may include, for example, a visual display device (e.g., a computer monitor), a data entry device (e.g., a keyboard), persistent and/or volatile storage (e.g., computer memory), a computer processor, and a mouse. In one particular embodiment, each intermediate computer 412 is a laptop computer running the Windows 7 operating system produced by Microsoft Corporation of Redmond, Wash. In addition, each intermediate computer 412 may employ a software program to import images from the cameras 408, and to apply settings (e.g., shutter speed, aperture, ISO setting, etc.) to the cameras 408. Third-party software, such as, for example, the BreezeSys Multi Camera software available from Breeze Systems Limited of the United Kingdom, may be employed for this purpose.

In one embodiment, as illustrated in FIG. 7, each intermediate computer 412 is connected to ten still cameras 408, for example through ten independent USB cables. In one exemplary embodiment of the system 400 depicted in FIG. 7, N=100, meaning that there are 100 cameras 408, 101 trigger modules 404, and ten intermediate computers 412 (each of which is connected to ten cameras 408). Of course, as will be understood by one of ordinary skill in the art, fewer or more than ten cameras 408 may be connected to each Intermediate computer 412, In addition, there may be fewer or more than 100 cameras 408 (and thereby fewer or more than 101 trigger modules 404) in the system 400.

In one embodiment, each intermediate computer 412 of the system 400 is in communication with the image processing computer 410. For example, each intermediate computer 412 may be hard-wired to the image processing computer 416. In another embodiment, each intermediate computer 412 communicates with the image processing computer 416 over a network. The network may be, for example, a local-area network (LAN), such as a company Intranet, a metropolitan area network (MAN), or a wide area network (WAN), such as the Internet. Each of the intermediate computers 416 may be connected to the network through a variety of connections including, but not limited to, standard telephone lines, LAN or WAN links (e.g., T1, T3, 56 kb, X.25), broadband connections (e.g., ISDN, Frame Relay, ATM), or wireless connections. The connections, moreover, may be established using a variety of communication protocols (e.g., HTTP, TCP/IP, IPX, SPX, NetBIOS, NetBEUI, SMB, Ethernet, ARCNET, Fiber Distributed Data Interface (FDDI), RS232, IEEE 802.11, IEEE 802.11a, IEEE 802.11b, IEEE 802.11g, and direct asynchronous connections). The intermediate computers 412 may, for example, transmit the still images received from the still cameras 408 to the image processing computer 410 for further processing thereat.

The image processing computer 416 may, for example, arrange the still images (or a subset thereof) in an order so as to create, as further described below, the visual representation of the object that was imaged. The image processing computer 416 may be, for example, any type of personal computer, Windows-based terminal, network computer, wireless device, information appliance, RISC Power PC, X-device, workstation, mini computer, main frame-computer, personal digital assistant, handheld device, or other computing device that is capable of both arranging the plurality of still images to create, as described herein, the visual representation of the object, and communicating with the storage medium 420. The image processing computer 416 may include, for example, a visual display device (e.g., a computer monitor), a data entry device (e.g., a keyboard), persistent and/or volatile storage (e.g., compute memory), a computer processor, and a mouse.

For its part, the storage medium 420 may be any hardware device, or software module with a hardware interface, that is capable of storing information, such as a digital file that includes the visual representation of the object that was imaged. In one embodiment, the storage medium 420 is local to (e.g., resides upon) the image processing computer 416. In another embodiment, the storage medium 420 is located remotely from the image processing computer 416. For example, the storage medium 420 may reside upon a user device, such as a mobile computing device (e.g., a personal digital assistant, a tablet computer, or a smartphone). As another example, the storage medium 420 is located remotely from the image processing computer 416 and is accessible by, but does not reside upon, a user device, such as a mobile computing device (e.g., a personal digital assistant, a tablet computer, or a smartphone). For example, the storage medium 420 may reside upon an e-mail server that is accessible by the user device, upon a server for a social networking site that is accessible by the user device, etc.

It will be understood by those skilled in the art that FIG. 7 is a simplified illustration of the system 400 and that it is depicted as such to facilitate the explanation of the present invention's embodiments. Moreover, while the system 400 depicted in FIG. 7 may be most amenable for use with the domed system 100 depicted in FIGS. 1 and 2, the system 400 may nevertheless be modified in a variety of manners without departing from the spirit and scope of the invention. For example, to make the system 400 more amenable for use with the spiral-walled system 200 depicted in FIGS. 3 and 4 or the arcuate system 300 depicted in FIGS. 5 and 6, the functionality of the camera system controller 402, the intermediate computers 412, and the image processing computer 416 may be implemented by a single computer processor, or by multiple computer processors that operate upon a single computing device. As such, the depiction of the system 400 in FIG. 7 is non-limiting.

Figure 8:
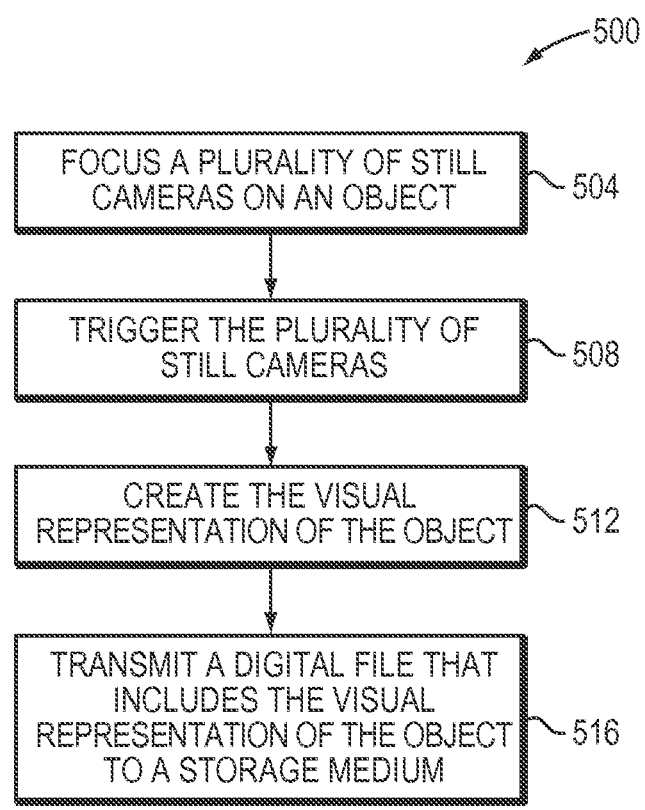
FIG. 8 is a flow, diagram of a method for producing a visual representation of an object in accordance with one embodiment of the invention.

With reference now to FIG. 8 in one illustrative embodiment of a method 500 for producing a visual representation of an object, for example using the system 400 of FIG. 7, the plurality of still cameras 408 are first focused (at step 504) on the object to be imaged. Then, at step 508, the plurality of still cameras 408 are triggered to capture a plurality of still images of the object. At least some of the plurality of still images may then be arranged, at step 512, in an order as part of creating the visual representation of the object. A digital file that, includes the visual representation of the object may then be transmitted, at step 516, to the storage medium 420, which, as previously described, is accessible by a user device, such as a mobile computing device (e.g., a personal digital assistant, a tablet computer, or a smartphone).

In greater detail, the plurality of still cameras 408 are first focused, at step 504, on the object to be imaged. This may be done manually, automatically by the still cameras 408 themselves, or automatically by the still cameras 408 in response to instructions received from, for example, the intermediate computers 412. In the case of the domed system 100 depicted in FIGS. 1 and 2, the ring 112 and/or the object on the stage may be raised or lowered to the appropriate height to give a proper perspective on the object to be imaged, and the cameras 108, 408 may their be appropriately focused upon the object. In the case of the spiral-walled system 200 depicted in FIGS. 3 and 4, a user may employ the afore-described interactive touch screen 216 of the structure 204 in order to raise or lower the adjustable support 212 to the appropriate height to give a proper perspective on the object to be imaged, and the cameras 208, 408 may then be appropriately focused upon the object. And, in the case of the arcuate system 300 depicted in FIGS. 5 and 6, the arc 304 of steel pipe and/or the adjustable support 312 may be raised or lowered to the appropriate height to give a proper perspective on the object to be imaged, and the cameras 308, 408 may then be appropriately focused upon the object. The object may be, for example, an individual, an article of clothing, a fashion accessory, a cosmetic product, or a work of art. Moreover, the object itself may be stationary, or may be moving (e.g., the individual may be dancing, or the article of clothing may be tossed into the air so as to fall freely under the influence of gravity). Accordingly, the cameras 108, 208, 308, 408 may need to be refocused throughout the photo shoot in order to account for the movement of the object. The cameras 108, 208, 308, 408 may do so automatically themselves, and/or in response to instructions received from, for example, the intermediate computers 412.

During the photo shoot, and at step 508 of the method 500 depicted in FIG. 8, the plurality of still cameras 108, 208, 308, 408 are triggered to capture a plurality of still images of the object. To achieve this purpose, the camera system controller 402 may control the triggering of the cameras 108, 208, 308, 408 in a variety of manners. In one embodiment, the camera system controller 402 issues both (i) serial command data signals and (ii) a trigger signal along a serial line. When the trigger signal is executed by a first trigger module 404 to begin the process of triggering its associated camera 408, that trigger module 404 may then translate the trigger signal into a hardware signal for triggering further cameras 408. That hardware signal may then be propagated along the daisy chain of trigger modules 404.

Each of the signals may be, for example, a 0-5 volt, single ended TTL logic signal. Upon issuance of a signal from the camera system controller 402, the signal propagates sequentially from one trigger module 404 to the next. In particular, each trigger module 404 may act as both an amplifier and a repeater. For example, each signal input to a trigger module 404 may be buffered with a Schmidt trigger input and may be subsequently replicated by a line driver to the output of the trigger module 404 to ensure robust signal propagation through the many (e.g., hundreds) of trigger modules 404.

In one embodiment, the camera system controller 402 specifies (for example through the issuance of a serial command data signal to all of the trigger modules 404) the direction in which a given signal or group of signals will flow—either "up" from the tall trigger module 0 to the head trigger module N, or "down" from the head trigger module N to the tail trigger module 0. In one embodiment, even when the propagation direction is set to "down," the signal(s) first propagate up through the daisy chain of trigger modules 404 from the tail trigger module 0 to the head trigger module N (without being acted upon fey the trigger modules 404). The head trigger module N then begins the propagation of the signal(s) downward from the head trigger module N to the tail trigger module 0 for execution at the various trigger modules 404. By controlling the propagation direction of the signal(s), the camera system controller 402 can ensure that any given signal to be executed only flows and propagates through the daisy-chained trigger modules 404 in one direction. In addition, the camera system controller 402 can ensure that the given signal in fact propagates through all trigger modules 404 in the daisy chain.

In one embodiment, the camera system controller 402 further configures the trigger modules 404, and thus the cameras 108, 208, 308, 408, to operate in one of two modes: either a sequential triggering mode or an instantaneous triggering mode. In, for example, the sequential triggering mode, each trigger module 404 triggers its associated camera 108, 208, 308, 408 in sequence after a user-selected delay between the triggering of each camera. If these still images are then arranged in the order in which they were taken (as discussed, further below in reference to step 512 of FIG. 8), the illusion of a single camera moving around a stationary object or within a dynamic scene may be achieved.

To operate the trigger modules 404, and thus the cameras 108, 208, 308, 408, in the sequential triggering mode, the camera system controller 402 may, for example, issue a serial command data signal that instructs all of the trigger modules 404 to operate in the sequential triggering mode. In addition, the camera system controller 402 may issue a serial command data signal (or multiple serial command data signals) to set a delay time in an internal timer of each trigger module 404. In one embodiment, the delay time ranges from 0 to 6553.5 milliseconds (i.e., 6.5535 seconds) and is fully variable within that range. The delay time set in each trigger module 404 may be the same, or, alternatively, the delay time may be set to be different in various trigger modules 404.

Once the mode of the trigger modules 404 has been set to sequential, and the delay time of each trigger module 404 set, the camera system controller 402 may issues wake signal, which may be passed on by the various trigger modules 404 to their associated cameras 108, 208, 308, 408. The wake signal ensures that the cameras 108, 208, 308, 408 are in a state of readiness to image the object. For example, if one of more of the cameras 108, 208, 308, 408 has entered a "sleep" mode, the wake signal powers the camera 108, 208, 308, 408 up, automatically focuses it on the object to be imaged, etc.

Following the wake signal, the camera system controller 402 may issue a trigger signal. Assuming that the camera system controller 402 has set the propagation direction of the signals to be "up" (i.e., from the tail trigger module 0 to the head trigger module N), when the trigger module 1 (and each trigger module 404 thereafter located in the daisy-chain) receives the trigger signal from its neighboring downstream trigger module 404, it immediately fires the shutter of its associated camera 108, 208, 308, 408 to capture a still image of the object, then waits its programmed delay time, and then sends the trigger signal to its neighboring upstream trigger module 404 to immediately fire the shutter of its associated camera 108, 208, 308, 408, etc. In one embodiment, this sequential triggering mode may be employed to create a motion picture frame rate effect. For example, by setting the delay time in each trigger module 404 to 41.6 milliseconds, a frame rate equivalent to 24 frames/second may be achieved.

With reference still to step 508 of FIG. 8, the camera system controller 402 may, as mentioned, also operate the trigger modules 404, and thus the cameras 108, 208, 308, 408, in the instantaneous triggering mode. In one embodiment, to operate in this mode, the camera system, controller 402 first issues a serial command data signal that instructs ail of the trigger modules 404 to operate in the instantaneous triggering mode. In addition, the camera system controller 402 may issue a serial command data signal to set an equal delay time in the internal timer of each trigger module 404. Again, in one embodiment, the delay time lies between 0 and 6553.5 milliseconds (i.e., 6.5535 seconds).

Once the mode of the trigger modules 404 has been set to instantaneous, and the delay time of each trigger module 404 has been equally set the camera system controller 402 may issue a wake signal, which, as described above, ensures that the cameras 108, 208, 308, 408 are in a state of readiness to image the object. Then, the camera system controller 402 may issue a trigger signal. Again, assuming that the camera system controller 402 has set the propagation direction of the signals to be "up" (i.e., from the tail trigger module 0 to the head trigger module N), when the trigger module 1 (and each trigger module 404 thereafter located in the daisy-chain) receives the trigger signal from its neighboring downstream trigger module 404, it starts its delay timer and immediately sends the trigger signal to its neighboring upstream trigger module 404. When the delay timer of each trigger module 404 elapses, each trigger module 404 fires the shutter of its associated camera 108, 208, 308, 408 to capture a still image of the object. In this mode of operation, the trigger signal propagates substantially instantaneously to all of the trigger modules 404 and starts their delay timers at substantially the same moment. Accordingly, each still, camera 108, 208, 308, 408 images the object at substantially the same moment. In this context, the word "substantial" is employed in recognition of the fact that them may be a very minor (e.g., 50 nanosecond) propagation delay from one trigger module 404 to the next trigger module 404 in the daisy chain.

Alternatively, in another embodiment, after the camera system controller 402 issues a serial command data signal that instructs all of the trigger modules 404 to operate in the instantaneous triggering mode, the camera system controller 402 sets a different delay time in the internal timer of each trigger module 404. Because in the instantaneous triggering mode a trigger module 404, upon receiving the trigger signal from its neighboring downstream, trigger module 404, starts its delay timer and immediately sends the trigger signal to its neighboring upstream trigger module 404, the different delay time in the internal timer of each trigger module 404 may cause the cameras 108, 208, 308, 408 to image the object out of sequence. For example, the object may first be imaged by camera 10 (if its delay timer expires first), followed by camera 3, followed by camera 93, followed by camera 21, etc. By varying the delay time in the internal timer of each trigger module 404, one may cause the cameras 108, 208, 308, 408 to image the object in any particular order or in any random order.

In another embodiment, the camera system controller 402 mixes and matches the sequential triggering mode and the instantaneous triggering mode together in a more complex operation. For example, the camera system control let 402 can first cause the first 25 cameras 108, 208, 308, 408 to sequentially image the object, then the next 50 cameras 108, 208, 308, 408 to instantaneously image the object, and then the following 25 cameras 108, 208, 308, 408 to sequentially image the object.

In addition, the camera system controller 402 may issue "waves" of trigger signals (i.e., multiple trigger signals in rapid succession) to the trigger modules 404. For example, the camera system controller 402 may repeatedly issue signals that cause the cameras 108, 208, 308, 408 to each image the object at the same time every 50 milliseconds. As another example, the camera system controller 402 may repeatedly issue signals that cause the cameras 108, 208, 308, 408 to first sequentially image the object from tail to head, then to sequentially image the object from head to tail, then to sequentially image the object from tail to head, then to sequentially image the object from head to tail, and so on. As yet another example, the camera system controller 402 may first cause the odd numbered cameras 108, 208, 308, 408 to sequentially image the object, then the even numbered cameras 108, 208, 308, 408 to image the object substantially simultaneously, and then the odd numbered cameras 108, 208, 308, 408 to again sequentially image the object. Accordingly, as can be seen, the use of the system 400, and in particular the use of a separate trigger module 404 for each camera 108, 208, 308, 408, advantageously allows one to trigger the cameras 108, 208, 308, 408 in virtually any order and at virtually any time to provide extraordinary versatility in control and creative output.

In yet another embodiment, the daisy chain of trigger modules 404 includes a certain number of trigger modules 404 that interface with photography props, rather than with the cameras 108, 208, 308, 408. For example, a given number of (e.g., five) trigger modules 404 may interface with and actuate strobe lights independent of each camera's flash. By employing the trigger modules 404 to actuate the strobe lights in concert with the soil image photography described above, one may create, for example, ghosting effects in the captured images. One may, for example, fire multiple strobe events during each exposure or fire multiple strobes within a sequential series of exposures. The trigger modules 404 may also actuate one or more electromechanical solenoids, fluid valves, or other props to drop, release, or move objects (e.g., apparel, a fashion, accessory, etc.) or other items (e.g., confetti, water, etc.) in the various systems described above for additional creative effects. The strobes and other props and effects may, for example, be timed and triggered synchronously with the cameras 108, 208, 308, 408. In another embodiment, the intermediate computers 412 may be employed to adjust the exposure time on the cameras 108, 208, 308, 408 to create blurring effects in the various still photographic images that are captured.

With reference now to step 512 of the method 500 depicted in FIG. 8, once the plurality of still images of the object have been captured, the intermediate computers 412 transmit the still images to the image processing computer 416, which arranges at least some of the plurality of still images in an order as part of creating the visual representation of the object. For example, in one embodiment, the cameras 108, 208, 308, 408 include a sequential order (e.g., camera 1 is at the tail of an arcuate pattern of cameras, and camera N is at the head of an arcuate pattern of cameras) and the image processing computer 416 operates to arrange the images captured by the cameras 108, 208, 308, 408 in that sequential order. Where, for example, the cameras 108, 208, 308, 408 are arranged in a semi-circular pattern around, an object and the cameras 108, 208, 308, 408 are all caused to image the object at the same time, arranging the captured images in that order and then presenting the images in that order in rapid succession gives the illusion of a stationary object being rotated and/or of moving a camera in a rotational fashion around a "frozen" dynamic object. As another example, where the cameras 108, 208, 308, 408 are arranged in a semi-circular pattern, around an object and the cameras 108, 208, 308, 408 are caused to sequentially image the object in order, arranging the captured images in that sequential order of the cameras 108, 208, 308, 408 gives the illusion of rotational camera movement around the stationary or dynamic object. As will be understood by one of ordinary skill in the art, the plurality of still images may be arranged in any desired order in order to suit a particular application.

In one embodiment, after the plurality of still images are arranged in the desired order, the image processing computer 416 then processes the collection of still images to create a point cloud, a polygon mesh, or another form of a three-dimensional visual representation or model of the object or scene captured in the collection of still images. Markers or other pre-computed information from the domed system 100, spiral-walled system 200, and/or arcuate system 300 may be used to inform this process (i.e., in the extraction of features from the two-dimensional, images to create depth in the three-dimensional visual representation or model). Third-party software, such as, for example, the type of software available from Urban Robotics of Portland, Oreg., may be employed for the purpose of converting the two-dimensional imagery from the collection of still images into the three-dimensional visual representation or model.

If the object captured in the still images is an individual, the image processing computer 416 may use the generated three-dimensional visual representation or model to create a personal avatar of the individual. The image processing computer 416 may, for example, combine a collection of facial stills and a collection of body stills to create a composite avatar of the individual. Moreover, the still images that were captured may be used to texture the avatar. As further explained below, an end user may then employ a user device, such as a tablet computer or a web interface of another device, to modify those textures. For example, entirely new garments or apparel (i.e., virtual clothing) not present in the still images that were employed in generating the avatar may be added after the fact by the end user in a virtual fitting session. As another example, virtual cosmetics may be applied to the avatar.

The visual representation of the object created by the Image processing computer 416 at step 512, which may include an ordered series of two-dimensional images of the object, a three dimensional visual representation or model of the object, and/or a personalized avatar, may be stored, for example, in a digital file. At step 516, the image processing computer 416 transmits the digital file that includes the visual representation of the object to the storage medium 420. The storage medium 420 is accessible by a user device. In one particular embodiment, and with reference to FIGS. 3 and 4, the user device is the interactive touch screen 216 of the structure 204. In that instance, the storage medium 420 may be a computer memory resident in the structure 204 itself that is accessible through interaction with the interactive touch screen 216. In another embodiment, the user device is a mobile computing device, such as a personal digital assistant, a tablet computer, or a smartphone. In that instance, the storage medium 420 may be the computer memory resident in the mobile computing device itself, or it may be the computer memory resident on another remote machine, such as the computer memory resident upon an e-mail server that is accessible by the mobile computing device or the computer memory resident upon a server for a social networking site that is accessible by the mobile computing device. Accordingly, the digital file that includes the visual representation of the object may be transmitted by the image processing computer 416 over a network (such as the internet, or any other network described herein) to the storage medium 420.

Figure 9:
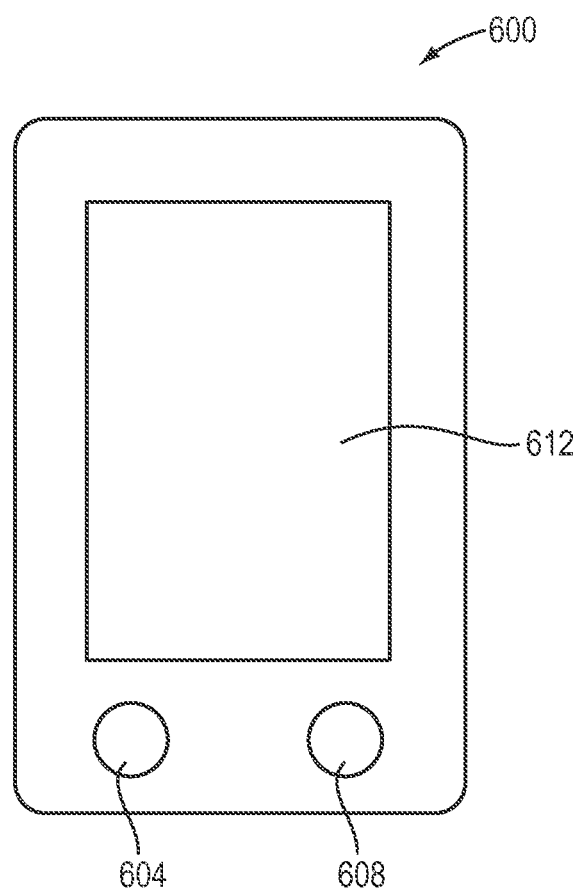
FIG. 9 schematically illustrates a user device in accordance with one embodiment of the invention.

FIG. 9 depicts one embodiment of a user device 600 in accordance with the invention. In the particular embodiment shown, the user device 600 is a mobile computing device having input buttons 604, 608, and a display screen 612. The user device 600 may also include, for example, persistent and/or volatile storage (e.g., computer memory) and a computer processor. The user device 600 is operable to access the storage medium 420 and to retrieve therefrom the digital file that includes the visual representation of the object. In addition, the user device 600 is operable to download, if needed, an application that enables the visual representation of the object to be viewed. Such an application may be made available by, for example, an online application store, such as the Apple App Store provided by Apple, Inc. of Cupertino, Calif. The visual representation of the object may then be displayed on the display screen 612 of the user device 600.

The visual representation of the object is user manipulable to present multiple views of the object. In one embodiment, the display screen 612 is a touch screen and the visual representation of the object is user manipulable through touch input. In one particular embodiment, the visual representation of the object is user manipulable to present the arrangement of still images in the order in which they were arranged by the image processing computer 416 at step 512 of the method 500 and also to present the arrangement of still images in reverse of that arranged order. As a concrete example, take the case where the object imaged was an individual and the individual when being imaged faced a semi-circular pattern of cameras 108, 208, 308, 408 (as depicted, for example, in FIGS. 3 and 4) that all imaged the individual at the same time. Assume further that in step 512 those still images of the individual were arranged in the same order as the respective cameras 108, 208, 308, 408 that took those images were arranged along the circumference of the semi-circular pattern. In such a case, by dragging one's finger on the display screen 612 in one direction, one may cause the still images of the visual representation to be presented in rapid succession such that the individual's face appears to be rotating in a clockwise direction. Then, by dragging one's finger on the display screen 612 in the opposite direction, one causes the presentation of the still images of the visual representation to reverse order such that the individual's face appears to be rotating in a counter-clockwise direction. Such a rotatable visual representation of the individual may act, for example, as a personal avatar for the individual on social networking sites and the like.

In one embodiment, at least one feature in the visual representation of the individual is user-manipulable through a color palette. For example, the display screen 612 may display on one side a color palette of lipstick colors for a particular brand of lipstick (e.g., L'Oréal Paris). In such a case, the individual may conduct a self "beauty test" by applying several colors of the lipstick to the lips in her visual representation. Moreover, the individual may view that visual representation, (i.e., the beauty test) from several angles by rotating the visual representation in a clockwise or counterclockwise fashion. Different lighting effects (e.g., indoor, sunlight, cloudy, evening, etc.) may be added to depict the visual representation in different conditions. This may be a powerful tool, for example, to retailers of lipstick and to cosmetics stores and retail outlets.

As another example at least one article of clothing (e.g., a blouse) or fashion accessory (e.g., a watch) in the visual representation of the individual is changeable. Again, the user device 600 may present various articles of clothing or various fashion accessories available for purchase from a particular retailer. When a user selects a particular article of clothing or fashion accessory to "try on," that, article of clothing or fashion accessory may be overlaid upon the appropriate portion of the visual representation of the individual. Again, this feature may act as an important (and time-saving) purchasing tool for the individual and can be a powerful tool for retailers of clothing and fashion accessories.

In addition to employing a personalized avatar of the individual to conduct the afore-described "beauty-test" and to "try on" various articles of clothing or fashion accessories in a virtual fitting session, the personalized, avatar of the individual may also be used in, for example, film, video games, or other digital media. A number of licensing options may also be available for the likenesses generated. For example, information gathered from the centralized processing of avatars may be licensed to garment manufacturers to improve the fit of future clothes or to provide other biometric analytics of current and potential customers. In addition, the personalized avatars may also be used for printing using three-dimensional printing/rapid prototyping techniques. The still images, three-dimensional models, and/or avatars may also be used to generate stereoscopic images.

In addition to the above applications, embodiments of the invention find use in many other commercial applications and social settings. For example, the spiral-walled system 200 depicted in FIGS. 3 and 4 can be used by individuals to capture images and create the above-described visual representations at shopping malls (thereby replacing the modern-day photo booth), at weddings, at concerts, and at many other public and private events. In addition, in further embodiments, sound (e.g., music) can be added to the digital file storing the visual representation of the object. For example, a digital file storing a visual representation of an individual that was created at a rock concert may store certain singles from the band(s) who performed at that rock concert, and that music can be played back to the individual when he loads the digital file and displays his visual representation on the display screen 612. In such a fashion, embodiments of the invention can be used to create powerful and lasting memories that are user manipulable, rather than being merely playback renditions.

Museums and art galleries may also use the embodiments of the invention described above to archive sculptures, paintings, and other works of art. In addition still, auction houses can use the embodiments of the invention described above to create visual representations of three-dimensional items that they intend to auction over the internet. Similarly, the technology described above can be used to create a visual representation of any object (e.g., apparel, a fashion accessory, a cosmetic product, etc.) to be used in an advertising campaign, for example as it falls freely under the influence of gravity.

As another example, the embodiments of the invention described above can be used in sports to study the different body movements of athletes (e.g., the throwing motion of a football quarterback or a baseball pitcher, the swinging motion of a baseball hitter or a golfer, the jumping motion of an athlete, etc.). For example, a three-dimensional mapping of the athlete's body in motion may be created.

The embodiments of the invention described above also find use in the medical field. For example, three-dimensional images of an individual's body may be created at various points in time and observed/tracked overtime to identify changes in the individual's body. One exemplary application is to track the change in the body of an individual who is dealing with obesity. Another exemplary application is for plastic surgeons to create three-dimensional models of patients and to track their progress over time. Yet another exemplary application involves configuring the cameras 108, 288, 308, 408 and their image sensors to capture only ultraviolet light and to then employ the embodiments of the invention described above to image the faces of individuals in the ultraviolet spectrum. Such an application may find use, for example, in studying the freckles of individuals that are only visible in the ultraviolet spectrum.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system for producing a visual representation of an object, the system comprising:
    a structure for at least partially circumscribing the object;
    a plurality of still cameras mounted in fixed relation to each other;
    a plurality of trigger modules, configured to self-assign sequential hardware addresses, for triggering the plurality of still cameras;
    at least one computer processor for:
        i) controlling the plurality of trigger modules to trigger the plurality of still cameras and thereby capture a plurality of still images of the object;
        ii) creating the visual representation of the object by, at least in part, arranging at least some of the plurality of still images in an order; and
        iii) causing a digital file comprising the visual representation of the object to be stored on a storage medium accessible by a user device, the visual representation of the object being user-manipulable to permit presenting the visual representation in more than one way; and
    at least one user input/output module, in proximity to the structure and in communication with the at least one computer processor, usable by a user to direct application of different looks to the visual representation.

2. The system of claim 1, wherein the cameras are aimable at a common region.

3. The system of claim 1, wherein the visual representation of the object is user-manipulable through touch input.

4. The system of claim 1, wherein the computer processor is configured to trigger the cameras substantially simultaneously.

5. The system of claim 1, wherein the computer processor is configured to introduce a trigger delay between the triggering of each camera.

6. The system of claim 1, wherein the cameras comprise a sequential order and further wherein the computer processor is configured to arrange the images captured by the cameras in the sequential order.

7. The system of claim 1, wherein the object comprises an individual.

8. The system of claim 1, wherein the user device comprises a mobile computing device selected from the group consisting of a personal digital assistant, a tablet computer, and a smartphone.

9. The system of claim 1, wherein the cameras are coupled in proximity to the structure and are arranged in an arcuate pattern.

10. A method for producing a visual representation of an object circumscribed at least partially by a structure, the method comprising the steps of:
    accepting, by at least one user input/output module in proximity to the structure, a direction from a user to apply a particular look to the visual representation;
    controlling a plurality of trigger modules, configured to self-assign sequential hardware addresses, to trigger a plurality of still cameras aimed at the object and thereby capture a plurality of still images of the object;
    creating the visual representation of the object by, at least in part, arranging at least some of the plurality of still images in an order; and
    causing a digital file comprising the visual representation of the object to be stored on a storage medium accessible by a user device, the visual representation of the object being user-manipulable to permit presenting the visual representation in more than one way.

11. The method of claim 10, wherein the visual representation of the object is user-manipulable through touch input.

12. The method of claim 10, wherein the cameras are triggered substantially simultaneously.

13. The method of claim 10, further comprising introducing a trigger delay between the triggering of each camera.

14. The method of claim 10, wherein the cameras comprise a sequential order and further wherein the images captured by the cameras are arranged in the sequential order.

15. The method of claim 10, wherein the object comprises an individual.

16. The method of claim 10, wherein the user device comprises a mobile computing device selected from the group consisting of a personal digital assistant, a tablet computer, and a smartphone.

17. The system of claim 1, wherein the at least one user input/output module is usable by the user to provide access to the digital file using e-mail.

18. The system of claim 1, wherein the at least one user input/output module comprises a touch screen.

19. The system of claim 1, wherein the structure is modular.

20. The system of claim 1, wherein the structure defines an entry permitting access to an interior of the structure.

21. The system of claim 9, wherein the cameras are arranged in a ring.

22. The system of claim 1 further comprising a user instructional interface.

23. The method of claim 10 further comprising accepting, at the at least one user input/output module, a direction by the user to provide access to the digital file using e-mail.

24. The method of claim 10, wherein the at least one user input/output module comprises a touch screen.

25. The method of claim 10 further comprising instructing the user using a user instructional interface.

26. The system of claim 1, wherein each trigger module is associated with a single camera and each camera is associated with a single trigger module.

27. The system of claim 1, wherein each trigger module comprises at least one serial communication line for communicating serial command data signals.

28. The system of claim 1, wherein each trigger module comprises at least one communication line for communicating a hardware signal that triggers a camera.

29. The system of claim 1, wherein the plurality of trigger modules are further configured to validate a status of all signal interconnections therebetween.

30. The system of claim 1, wherein the at least one computer processor is configured, in controlling the plurality of trigger modules, to issue a command selected from the group consisting of a command indicating a direction in which signals are to propagate through the plurality of trigger modules, a command to set a mode of at least one trigger module, and a command to set a delay timer of at least one trigger module.

\* \* \* \* \*